United States Patent [19]
Lee et al.

[11] Patent Number: 5,355,279
[45] Date of Patent: Oct. 11, 1994

[54] NOTEBOOK COMPUTER WITH DISPLAY ASSEMBLY SELECTIVELY CONNECTABLE FOR PEN OR KEYBOARD INPUTTING OF DATA

[75] Inventors: Sanglae Lee, Kyungki; Keesoon Park, Seoul; Tafbaeg Kim, Kyungki, all of Rep. of Korea

[73] Assignee: Samsung Electronics Co., Ltd., Suwon, Rep. of Korea

[21] Appl. No.: 992,816

[22] Filed: Dec. 15, 1992

[30] Foreign Application Priority Data

Aug. 25, 1992 [KR] Rep. of Korea ............... 92-15299

[51] Int. Cl.$^5$ ............... H05K 7/10; G06F 1/16
[52] U.S. Cl. ............... 361/681; 345/905
[58] Field of Search ............... 364/708.1; 312/223.2; 361/679–686, 724–726, 730, 731, 733, 752, 784, 785, 796; 345/156, 173, 179, 905

[56] References Cited

U.S. PATENT DOCUMENTS 5,164,542 11/1992 Hart ............... 361/683 X

FOREIGN PATENT DOCUMENTS 2-90310 3/1990 Japan ............... G06F 1/16

*Primary Examiner*—Leo P. Picard
*Assistant Examiner*—Michael W. Phillips
*Attorney, Agent, or Firm*—Christie, Parker & Hale

[57] ABSTRACT

The present invention discloses a notebook computer having a pen input device comprising: a main body having a hard disk drive and a floppy disk drive formed inside its case, a keyboard installed on the case, and the rest of any peripheral equipment; a display having a central processing unit and a memory device and using a liquid crystal display panel as a monitor; a first connector formed at a hinge of the main body to be connected with the display; a second connector formed in the display to be combined correspondingly with the first connector, in order to be used both as a notebook computer and a pen computer by a turnabout rotation and connection of the first and second connectors. Therefore, such a portable computer can be adapted into two kinds of computers and is convenient and easy to carry.

8 Claims, 6 Drawing Sheets

NOTEBOOK COMPUTER WITH DISPLAY ASSEMBLY SELECTIVELY CONNECTABLE FOR PEN OR KEYBOARD INPUTTING OF DATA

BACKGROUND OF THE INVENTION (1) Field of the Invention

The present invention relates to a notebook computer, and more particularly to a notebook computer having a pen input device which can serve both as a notebook computer and a pen computer.

(2) Description of the Related Art

As has been well known, a personal computer referred to as a desktop computer comprises a main body, a monitor and a keyboard, and is mounted on a desk to be used. Such a desktop computer, however, is not handy to carry outdoors and, at the time of operating the computer, data is inputted just by using the keyboard. This is a problem because a user has to learn how to use the keyboard for the operation of the computer.

In order to solve this problem, a small-sized portable computer, i.e., a notebook computer and a pen computer in which a user inputs data by means of a pen without the use of the keyboard has been developed and widely distributed.

Figure 8:
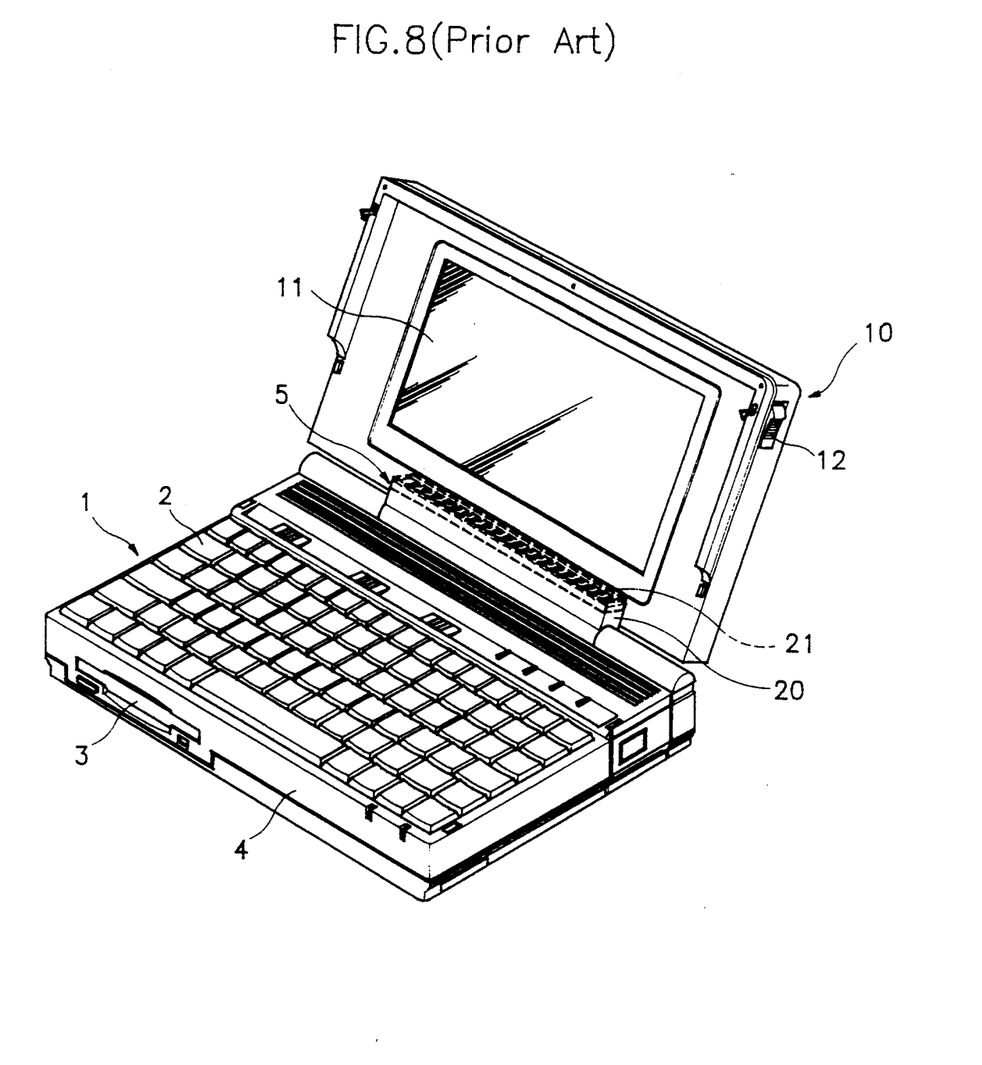
FIG. 8 is a perspective view of a conventional notebook computer in a separated position.

A conventional notebook computer as shown in FIG. 8 comprises a main body 1 having a keyboard 2, a floppy disk drive 3, a hard disk drive, and the rest of any peripheral equipment, a display means including a central processing unit (CPU), a memory device, a liquid crystal display panel 11 as a monitor, and a hinge 5 formed in a foldable form to connect the lower portion of the display means 10 to the rear portion of the main body.

This notebook computer is used in the state that the liquid crystal display panel 11 looks forward by getting the display means 10 up. When not in use, the display means 10 is folded over the upside of the main body 1 to shut the computer up in such a manner that the computer takes the form of a customary bag to be portable.

In regard to the pen computer, data is inputted by using a pen on a liquid crystal display panel, and input or output of data is possible without the use of the keyboard.

The notebook computer, as mentioned above, is handy to carry but has the disadvantage of giving limited play to its functions because it can only operate by means of the keyboard. As circumstances require, the efficiency of work is increased by using either a pen computer or a notebook computer.

As mentioned above, the pen computer can operate without the use of the keyboard but programs for the pen computer have not yet been developed enough to take over the operations that a conventional computer carries out. Hence, the notebook computer and the pen computer were manufactured separately according to the conventional art technology, and have their own limited functions individually, which cannot meet the above requirements.

Thus, in order to solve the problems, researches have been recently made regarding the computers serving both as a notebook computer and a pen computer.

SUMMARY OF THE INVENTION

An object of this invention is to provide a notebook computer having a pen input device that can be used both as a notebook computer and a pen computer by a change of connection between a main body and a display means according to circumstances.

In order to achieve this object, a notebook computer having a pen input device of this invention comprises:

a first means for including a keyboard as a data input means;

a second means being capable of separating from the first means for including an output means to display an output result and recognize data input by the pen input device;

connecting means for connecting the first means to the second means and making one of the pen and the keyboard operate selectively.

The central processing unit, memory and auxiliary memory can be installed in the first means or the second means.

The central processing unit and memory are preferably installed in the second means and an auxiliary memory is preferably installed in the first means.

According to this invention, the connecting means includes a first connecting means installed in the first means; a second connecting means installed in the second means to communicate a signal from the keyboard to the first connecting means and to operate the keyboard as an input means; a third connecting means installed in the second means to communicate a signal from the pen to the first connecting means and operate the pen as an input means.

Furthermore, the second connecting means may be formed to be spaced from the third connecting means and connected with the first connecting means selectively.

Also the first connecting means consists of a fourth connecting means that can operate the input means and a fifth connecting means that cannot operate the input means, and the fourth connecting means and the fifth connecting means may be selectively connected to the respective second and third connecting means to operate one of the pen input means and the keyboard input means selectively.

BRIEF DESCRIPTION OF THE DRAWINGS

This invention can be more fully understood from the following detailed description when taken in conjunction with the accompanying drawings wherein.

DETAILED DESCRIPTION OF THE PREFERRED EMBODIMENTS

Figure 1:
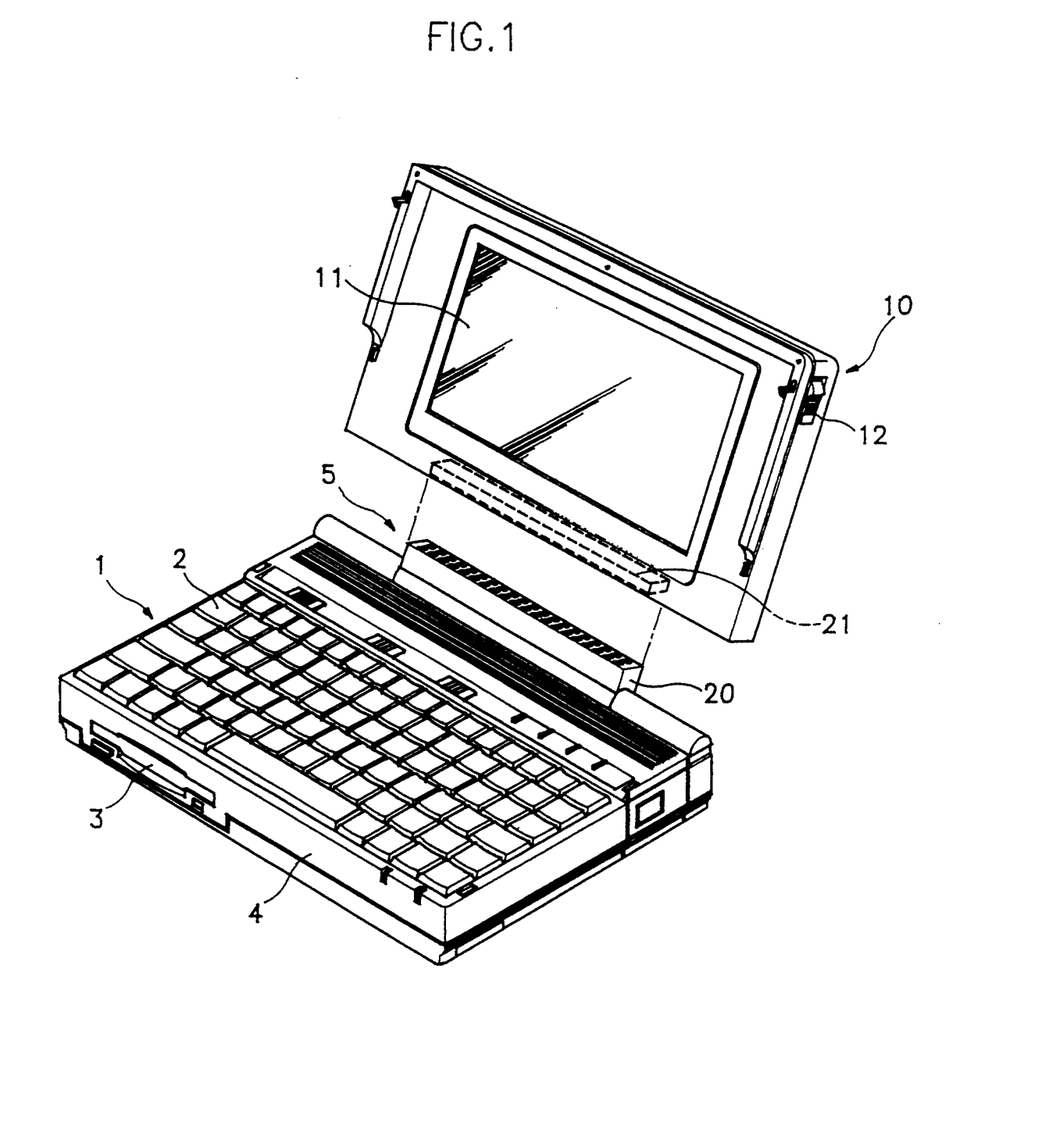
FIG. 1 is a perspective view of a notebook computer having a pen input device in a separated position in accordance with a first preferred embodiment of this invention.

Referring now to FIG. 1, a notebook computer having a pen input device of this invention comprises a main body including a hard disk drive and floppy disk drive installed inside its case and a keyboard mounted on the case; a display means including a central processing unit (CPU) and a memory device and using a liquid crystal display panel as a monitor; and a first connector formed in the main body to connect with the display means to a hinge in the rear portion of the main body; a second connector formed in the display means to be united (connected) correspondingly with the first connector of the main body, in order to be used as a notebook computer and a pen computer by a turnabout connection of the connectors.

In order that the computer of the present invention can be converted into a notebook computer or a pen computer by making the display means completely face-about, the connector is formed, with twice the number of guide pins as are actually used, and divided into two parts: one part for a notebook computer and the other part for pen computer. The connector of the main body has guided slots, as many as the guide pins and, preferably, one part of the connector is a true (line) connector connected to the installed equipment of the main body and the other part is a false (dummy) connector that is not connected thereto.

Figure 4:
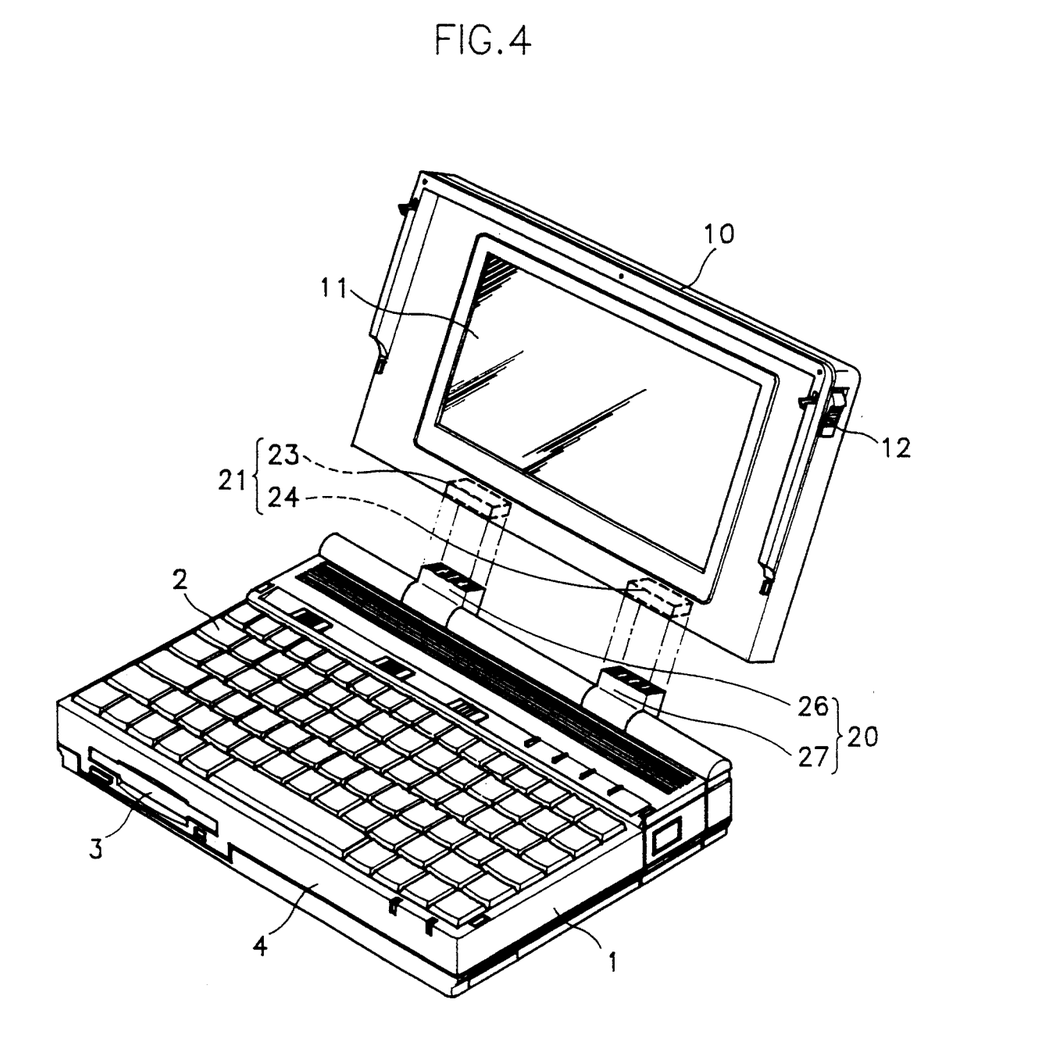
FIG. 4 is a perspective view of a notebook computer having a pen input device in a separated position in accordance with a second preferred embodiment of this invention.

Turning now to FIG. 4, as another means that the computer of this invention can be converted into a notebook computer or a pen computer by making the display means completely face-about, connectors, respectively, formed at the hinge of the main body and the display means are divided into two parts one connector for a notebook computer and the other connector for a pen computer which are formed to be spaced from each other on both sides of the lower portion of the display means.

Besides, in the main body 1, a true connector is formed at one position and a false connector is formed at the other position to be connected with one of the connectors that is not actually used, thereby obtaining the same effect as that of the first embodiment as shown in FIG. 1.

In order to make such a combination, guide pins forming the connectors are arranged diagonally to each other, and even if the connector of the display means is connected to the connector of the main body after it makes a complete face-about, it is exactly connected to the true connector without change of the numbers of the guide pins and the guide slots.

Figure 6:
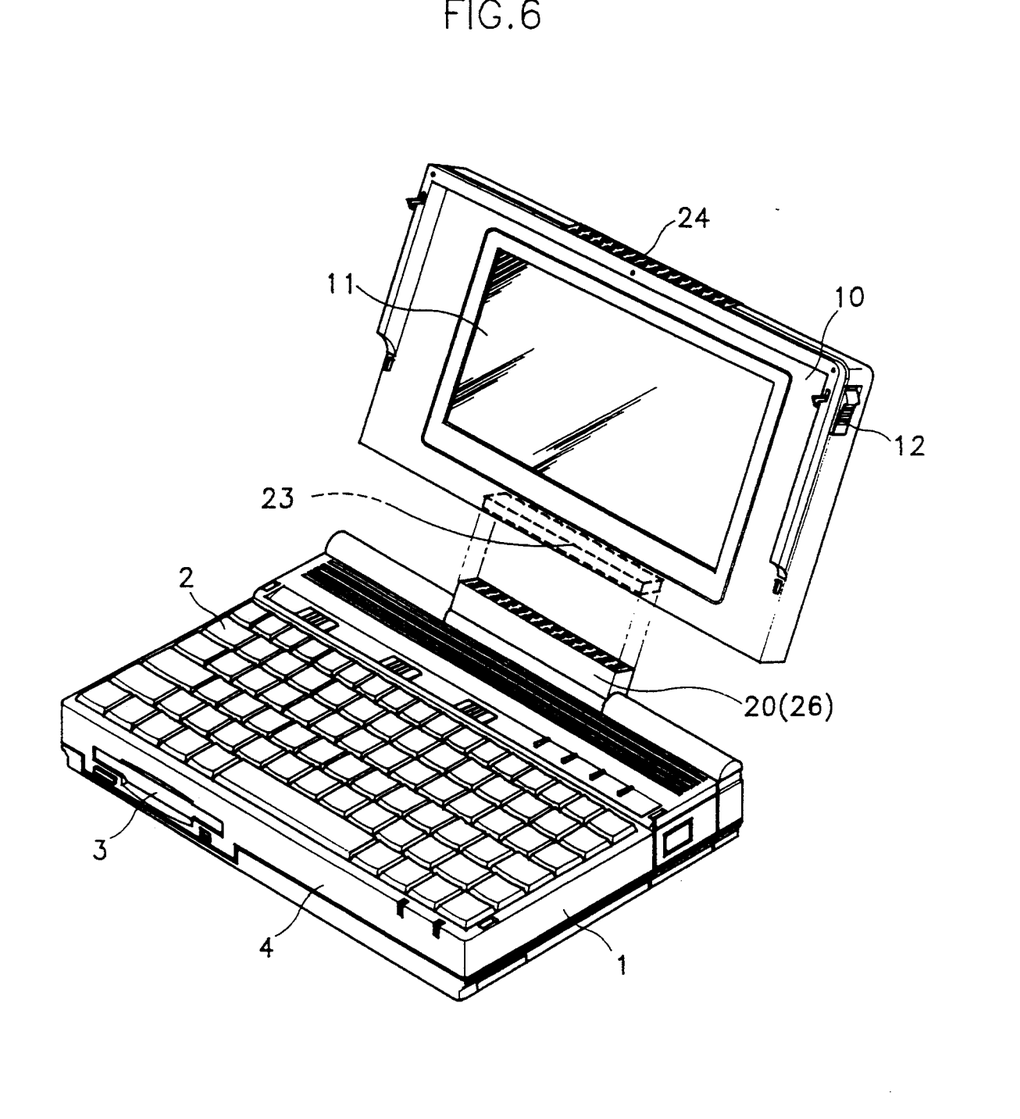
FIG. 6 is a perspective view of a notebook computer having a pen input device in a separated position in accordance with a third preferred embodiment of this invention.

In FIG. 6, just a true connector is formed in a connector of the main body, and a connector for a notebook computer and a connector for a pen computer may be formed on the front and rear plates of the display means to reversibly combine the display means with the main body. According to this, the same effect can be obtained, too.

Referring now to the accompanying drawings, preferred embodiments of this invention will now be fully described.

FIG. 1 depicts a first preferred embodiment of this invention, and a notebook computer having a pen input device in accordance with the present invention comprising a main body 1 and a display means 10. The main body 1 includes a hard disk drive (not illustrated) formed inside a case 4, a floppy disk drive 3, a keyboard 2 mounted on the case, the rest of any peripheral equipment, and a hinge 5 installed at the rear portion of the main body 1. The display means 10 is formed in a foldable form including a central processing unit (CPU) and a memory device, and using a liquid crystal display panel 11 as a monitor. This display means 10 further includes a locking means 12 for locking the display means 10 in the main body 1.

In such a notebook computer having a pen input device, a second connector 20 is formed to connect the hinge 5 installed at the rear portion of the main body 1 with the display means 10, and a second connector 21 is formed in the display means 10 to be combined correspondingly with the first connector 20, in such a manner that this notebook computer having a pen input device can be used both as a notebook computer and a pen computer by a turnabout connection of the connectors 20 and 21.

Figure 2A:
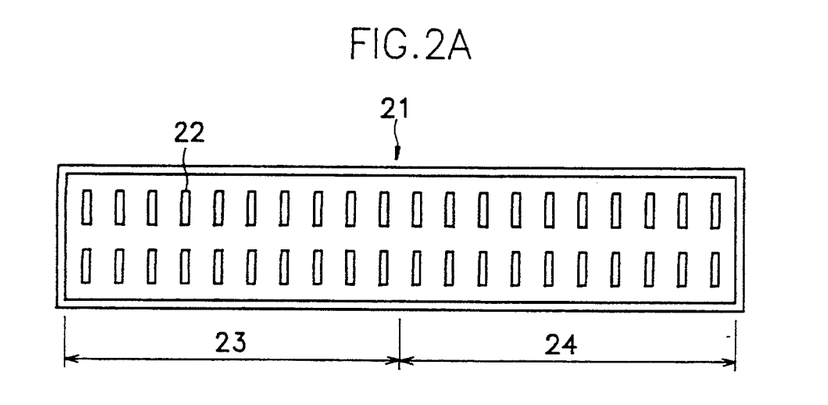
FIGS. 2A and 2B depict the formation of connectors applied to FIG. 1.
Figure 2B:
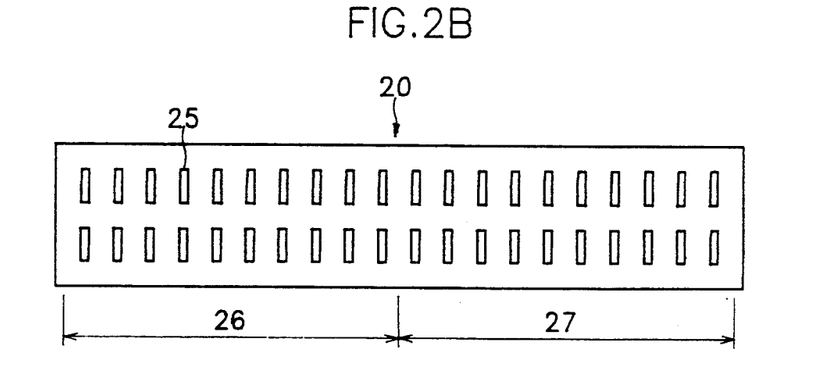

Accordingly, in the formation of the second connector 21 of the display means 10, the second connector 21 is formed with twice the number of guide pins (contacts) 22 as cue actually used, and divided into two parts as shown in FIG. 2A: one part for a notebook computer and the other part for a pen computer. The first connector of the main body has guide slots (contacts) 25, as many as the guide pins 22, and one part of the connector is a true connector 26 connected to the installed equipment of the main body and the other part is a false connector 27 that is not connected thereto, which is illustrated in FIG. 2B.

The analogms guide pins 22 in each connector 23 and 24 for a notebook computer and for a pen computer are arranged diagonally (diagonally symmetral) to each other, and even if the second connector 21 of the display means is connected to the first connector 20 of the main body 1 after it is made completely face-about, it is exactly connected to the true connector 26, without changing the numbers of the guide pins and the guide slots.

When the computer of this invention is used as a notebook computer, the connector for a notebook computer 23 of the display means 10 contacts the true connector 26 of the connector 20 in the main body 1. If this notebook computer is converted into a pen computer, after the display means 10 is separated from the main body 1, the first connector 20 contacts the second connector 21, by making the display means 10 completely face-about in such a manner that the connector 24 for a pen computer makes contact with the true connector 26.

Figure 3:
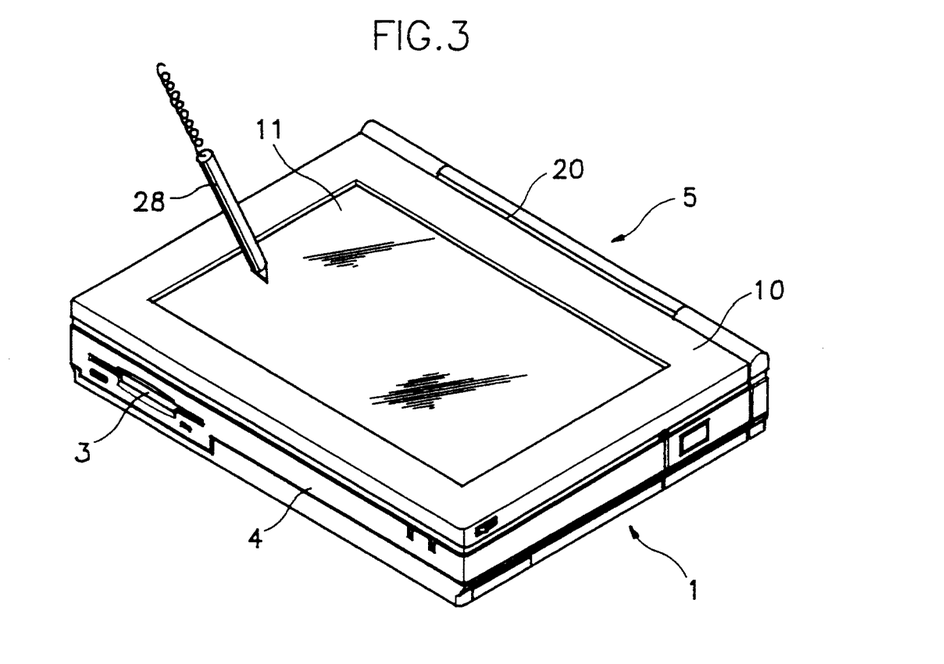
FIG. 3 is a perspective view of this invention in the open position.

As mentioned above, the notebook computer is used as a pen computer, by folding the display means 10 over the main body 1 after installing the liquid crystal display panel 11 on the display means 10 and inputting command languages on the liquid crystal display panel with a pen 28 as shown in FIG. 3.

According to this invention, the connectors 20 and 21 having a simple structure are formed at the hinge 5 of the main body 1 and the display means 10 having the function of a pen computer to use this computer both as a notebook computer and a pen computer by a turnabout rotation and connection of the display means 10.

Therefore, a portable computer can be adapted into two kinds of computers and is so handy to carry that it serves as a more convenient computer.

Figure 5A:
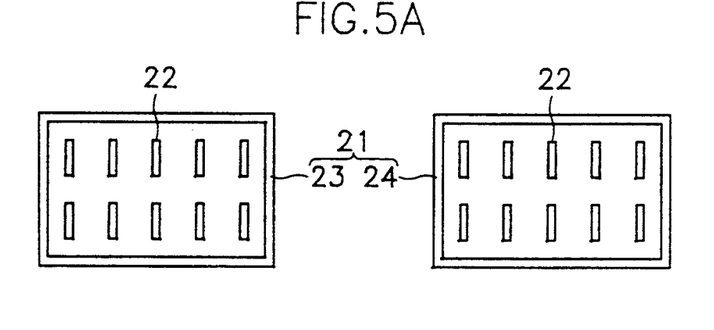
FIGS. 5A and 5B depict the formation of connectors applied to FIG. 4.
Figure 5B:
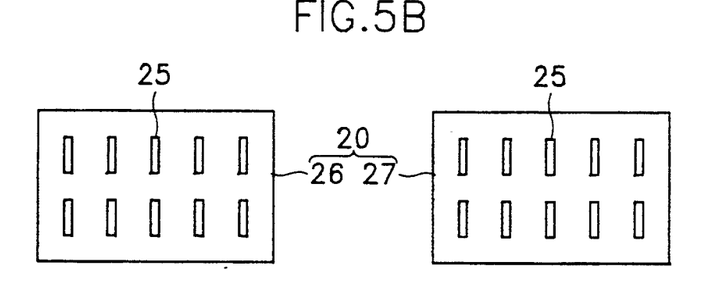

In FIG. 4 showing a second embodiment of this invention, first and second connectors formed at the hinge 5 of the main body 1 and the display means 10 are divided into two parts on both sides of the computer body. As shown in FIG. 5A, a connector 23 for a notebook computer and the other connector 24 for a pen computer are formed to be spaced from each other on both sides of the lower portion of the display means, unlike the first embodiment of the present invention. Besides, in the main body 1, a true connector 26 is formed at one position and a false connector 27 is formed at the other position to be connected with one of the second connectors 23 and 24 that is not actually used.

When in use, the connector 23 for a notebook computer of the display means 10 contacts the true connector 26 of the main body 1. If this computer is used as a pen computer from a notebook computer, after the display means 10 is separated from the main body 1, the first connector 20 contacts the second connector 21 by making the display means 10 completely face-about in such a manner that the connector 24 for a pen computer makes contact with the true connector 26.

As a third preferred embodiment in accordance with this invention appearing in FIG. 6, only a true connector 26 is formed in a first connector 20 of the main body 1, and a second connector 23 for a notebook computer and a third connector 24 for a pen computer may be formed on the front and rear plates of the display means whereby omission of the false connector 27 of the main body 1 is possible.

Accordingly, this computer is used as a notebook computer by connecting the second connector 23 for a notebook computer to the first connector 20 of the main body serving as the true connector 26. In addition, the computer can be used as a pen computer by reversing the display means 10 and connecting the third connector 24 for a pen computer with the first connector 20 of the main body 1.

The effect of the second and third preferred embodiment is the same as that of the first preferred embodiment in accordance with the present invention.

Figure 7:
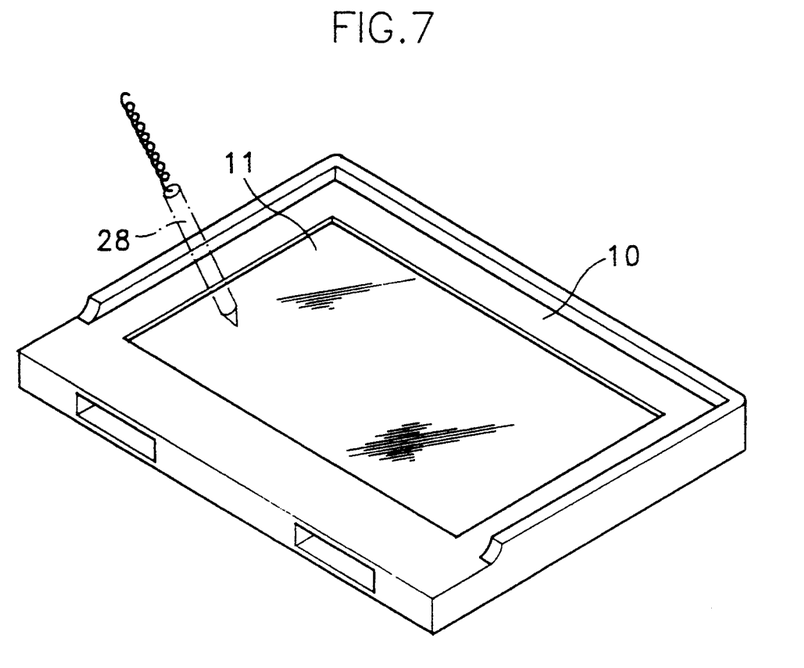
FIG. 7 is a perspective view of a notebook computer having a pen input device whose display means is separated from a main body.

FIG. 7 depicts a computer of this invention using a pen computer exclusive of a notebook computer. The computer may be used exclusively as a pen computer by separating the display means 10, including a central processing unit and a memory device, from the main body 1.

According to this invention, by using the connectors having a simple structure respectively formed at the hinge of the main body and the display means having the function of a pen computer, the computer may serve both as a notebook computer and a pen computer by means of a turnabout rotation and connection of the display means. Furthermore, various peripheral equipment such as a keyboard, an input or output port, etc., can be used, being connected with these connectors in such a manner that a portable computer can carry out more expansive functions of two kinds of computers and is convenient and easy to carry.

While the present invention has been described in connection with the preferred embodiments of the various Figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A notebook computer having a pen input device comprising:
   a main body having a keyboard;
   a display section including a central processing unit and a liquid crystal display panel as a monitor;
   a first connector formed at a hinge of said main body to be connected with said display means, said first connector including a true portion operably connected to said main body and a false portion not operably connected to said main body; and
   a second connector formed in said display section to be combined correspondingly with said first connector, said second connector including a first portion for keyboard inputting of information and a second portion for pen inputting of information,
   a keyboard inputting mode or a pen inputting mode of said notebook computer being selected by an orientation of said display section with respect to said main body which determines which said first portion or said second portion of said second connector is connected to said true portion of said first connector.

2. The notebook computer having a pen input device as set forth in claim 1, wherein said display section includes memory.

3. The notebook computer having a pen input device as set forth in claim 1, wherein said main body further includes an auxiliary memory device.

4. A notebook computer comprising:
   a keyboard for inputting data and located in a main body section of the computer;
   a display panel and a central processing unit located in a display body section; and
   a pen for inputting data,
   wherein the display body section comprises first and second contact pluralities and the main body section comprises a third contact plurality, said first and second contact pluralities selectively engageable with said third contact plurality to selectively operate the computer by means of said keyboard and pen, respectively.

5. The notebook computer of claim 4 wherein said first and second contact pluralities form first and second portions of a single display body connector and said third contact plurality forms a first portion of a main body connector which main body connector further comprises a second portion which is a dummy connector and wherein when one of said first and second portions of the display body connector is connected to the first portion of the main body connector said second portion of the main body connector engages the other portion of said first and second portions of the display body connector.

6. The notebook computer of claim 4 wherein the first contact plurality and second contact plurality form first and second display body connectors, respectively, which display body connectors are outwardly opposingly oriented in said display body.

7. The notebook computer of claim 4 wherein said first and second contact pluralities form first and second display body connectors, respectively, and said third contact plurality forms a first main body connector, which computer further comprises a second main body connector which second main body connector is a dummy connector.

8. The notebook computer of claim 7 wherein said first and second main body connectors are formed at a hinge between the main body section and the display body section.

* * * * *

UNITED STATES PATENT AND TRADEMARK OFFICE
CERTIFICATE OF CORRECTION

PATENT NO. : 5,355,279
DATED : October 11, 1994
INVENTOR(S) : Sanglae Lee; Keesoon Park; Taebaeg Kim It is certified that error appears in the above-indentified patent and that said Letters Patent is hereby corrected as shown below:

On the Title Page, Item [75] Inventors, change "Tafbaeg" to -- Taebaeg --.

Column 3, line 25, change "guided" to -- guide --.
Column 4, line 22, change "cue" to -- are --.
Column 4, line 31, change "analogms" to -- analogous --.

Signed and Sealed this

Ninth Day of May, 1995

Attest:

BRUCE LEHMAN

Attesting Officer

Commissioner of Patents and Trademarks